United States Patent [19]
Horino

[11] Patent Number: 5,008,763
[45] Date of Patent: Apr. 16, 1991

[54] ROTATION CONTROL DEVICE FOR A ROTARY HEAD IN A MAGNETIC RECORDING AND REPRODUCING DEVICE

[75] Inventor: Mamoru Horino, Hamamatsu, Japan

[73] Assignee: Yamaha Corporation, Hamamatsu, Japan

[21] Appl. No.: 219,044

[22] Filed: Jul. 14, 1988

[30] Foreign Application Priority Data

Jul. 17, 1987 [JP] Japan .................................. 62-178559

[51] Int. Cl.⁵ .............................................. G11B 5/52
[52] U.S. Cl. ......................................... 360/70; 360/75
[58] Field of Search ................... 360/8–10.3, 360/70, 73.05, 73.06, 73.08, 75, 77.13–77.17

[56] References Cited

U.S. PATENT DOCUMENTS

| | | | |
|---|---|---|---|
| 3,643,012 | 2/1972 | Clark et al. | 360/70 |
| 3,729,583 | 4/1973 | Yano | 360/70 |
| 3,742,132 | 6/1973 | Sanguu et al. | 360/70 |
| 4,047,231 | 9/1977 | Garagnon | 360/70 |

Primary Examiner—Aristotelis M. Psitos
Assistant Examiner—Steven R. Garland
Attorney, Agent, or Firm—Spensley Horn Jubas & Lubitz

[57] ABSTRACT

A rotation control device for a rotary head in a rotary head type magnetic recording and reproducing device such as an R-DAT cmprises a rotary head including an FG (frequency generator) for producing a signal at a period determined by equally dividing one rotation of a drum and a PG (phase generator) for detecting a rotation reference position of the drum, a circuit for generating a PG reference signal as a reference signal for a PG detection signal provided by the PG, a circuit for generating an FG reference signal as a reference signal for an FG detection signal provided by the FG, and a control circuit for controlling rotation phase of the drum to a predetermined state by controlling rotation of the drum in accordance with a phase error between the PG detection signal and the PG reference signal and a phase error between the FG detection signal and the FG reference signal. Rotation of the drum is controlled in accordance with the two phase errors in such a manner that the PG detection signal is locked with the PG reference signal at a predetermined phase difference and the FG detection signal is locked with the FG reference signal at a predetermined phase difference whereby the phase of rotation of the drum is controlled to a predetermined state.

5 Claims, 4 Drawing Sheets

ROTATION CONTROL DEVICE FOR A ROTARY HEAD IN A MAGNETIC RECORDING AND REPRODUCING DEVICE

BACKGROUND OF THE INVENTION

This invention relates to a rotation control device for a rotary head in a rotary head type magnetic recording and reproducing device such as an R-DAT (rotary head type digital audio tape recorder) and, more particularly, to improvement in response characteristics in a rotation phase control in such rotary head.

The R-DAT is a device which converts analog signals such as an audio signal into PCM signals, records the PCM signals on a magnetic tape and reproducing the same.

Rotation control of a rotary head in an R-DAT is generally made by combining speed control and phase control. The speed control is a control in which rotation of a rotary drum is servo controlled to a predetermined revolution number (normally 2000 rpm in the case of reproduction and recording in the mode I) to maintain a relative speed between the rotary head and a magnetic tape at a predetermined value (e.g., 3.13 m/sec in mode I). The phase control is a control in which phase of rotation of the rotary head is controlled to synchronize the position of the head with a recorded signal so that recorded signals for one track will be correctly recorded on one track (if there occurs a phase error, signals are sometimes recorded from the midway of the track).

The phase control is normally performed also during reproduction of a signal. In a reproduction system from the head to the signal processing circuit, a reproduced clock obtained from a reproduced signal is used whereas in a digital-to-analog converter provided on the output side, refererence clock such as Xtal is generally used and, accordingly, if the reference signal for rotation of the head drum is not synchronized with this reference clock, excess or shortage of data will occur through the system.

A prior art rotation control device for a rotary head is shown in FIG. 2. The rotary head 2 includes an FG (frequency generator) 30 which outputs a signal at a period determined by equally dividing one rotation of a drum 1 and a PG (phase generator or pulse generator) 32 which detects rotation reference position of the drum 1 (e.g., rotation position of the drum 1 when a head A, for example, has reached the track start position at the lower end of the tape).

Since the frequency of an FG detection signal from the FG 30 is proportional to the rotation speed of the drum 1, a speed servo circuit 12 obtains the rotation speed of the drum 1 from the FG detection signal from the FG 30 and obtains a speed error between the detected rotation speed and an ordered speed. A PG detection signal from the PG 32 represents the rotation reference position of the drum 1 and a phase servo circuit 14 compares the PG detection signal with a PG reference signal in phase for obtaining a phase error $\theta$.

The speed error signal and the phase error signal are added together by an adder 16 and used for controlling rotation of a drum motor 28 through a drive amplifier 18 so as to reduce these errors to zero.

In the prior art rotation control, the phase error $\theta$ is detected only once for one rotation of the drum 1. The phase control in the prior art rotation control therefore is slow in response speed and it takes time before reaching servo lock. Further, in a case where the revolution number of the drum 1 is 2000 rpm, sampling frequency of the phase error $\theta$ is a low frequency of 33.3 Hz (=2000 rpm/60 sec.) and, accordingly, upper limit response frequency is not more than 16 Hz even if there is no delay element (if a delay element such as phase delay in AFC closed loop is considered, the upper limit response frequency will be below 10 Hz) so that response to phase variation exceeding this frequency cannot be expected.

It is, therefore, an object of the invention to provide a rotation control device for a rotary head which has improved its response characteristics (response speed, upper limit response frequency etc.).

SUMMARY OF THE INVENTION

For achieving this object, the rotation control device according to the invention comprises a rotary head including FG means for producing a signal at a period determined by equally dividing one rotation of a drum and PG means for detecting a rotation reference position of the drum, means for generating a PG reference signal as a reference signal for a PG detection signal provided by said PG means, means for generating an FG reference signal as a reference signal for an FG detection signal provided by said FG means, the FG reference signal being synchronized in phase with the PG reference signal with a predetermined phase difference, and control means for controlling rotation phase of the drum to a predetermined state by controlling rotation of the drum in accordance with a phase error between the PG detection signal and the PG reference signal and a phase error between the FG detection signal and the FG signal in such a manner that the PG detection signal is locked with the PG reference signal at a predetermined phase difference and the FG detection signal is locked with the FG reference signal at a predetermined phase difference.

According to the invention, rotation of the drum is controlled by the control means in accordance with the two phase errors in such a manner that the PG detection signal and the PG reference signal are locked at a predetermined phase difference and the FG detection signal and the FG reference signal are locked at a predetermined phase difference whereby the phase of rotation of the drum is controlled to a predetermined state.

Since the FG detection signal is obtained with a period determined by equally dividing one rotation of the drum, a phase error can be detected at each period and a phase servo which has excellent response characteristics as compared with the prior art phase control relying solely upon the PG means can be realized.

Since the FG detection signal is obtained for plural periods for each rotation of the drum, the phase control relying solely upon the FG detection signal and the FG reference signal will cause this FG detection signal and the FG reference signal to be locked at any rotation phase determined by equally dividing one rotation by the FG detection signals. In the present invention, therefore, the phase control employing the PG detection signal and the PG reference signal is performed concurrently with the phase control employing the FG detection signal and the FG reference signal and these signals are locked at a predetermined rotation phase difference by synchronizing the FG refernce signal with the PG reference signal at a predetermined phase difference.

Since the FG detection signal and the PG detection signal normally have a phase difference between each other due to difference in mechanical installment conditions between the FG means and the PG means (i.e., the FG detection signal is not obtained simultaneously when the PG detection signal is obtained), a signal will be recorded and reproduced being accompanied by this phase difference if the phase lock is made using the FG detection signal without having regard to this phase difference. For preventing such phase error, the FG detection signal may be shifted relatively by a time length corresponding to this phase difference. Alternatively, the signal may be supplied to the head with a delay time corresponding to this phase difference. Such arrangement will cause the phase of the FG detection signal and the phase of the FG reference signal to coincide with each other at a position determined by equally dividing the rotation of the drum on the basis of the rotation reference position determined by the PG means whereby a signal can be recorded or reproduced without a phase error.

The invention is applicable not only to an R-DAT but also to other rotary head type magnetic recording and reproducing devices such as video tape recorders.

A preferred embodiment of the invention will be described with reference to the accompanying drawings.

BRIEF DESCRIPTION OF THE DRAWINGS

In the accompanying drawings.

DESCRIPTION OF PREFERRED EMBODIMENT

A preferred embodiment of the invention will now be described. In this embodiment, the invention is applied to an R-DAT.

Figure 4:
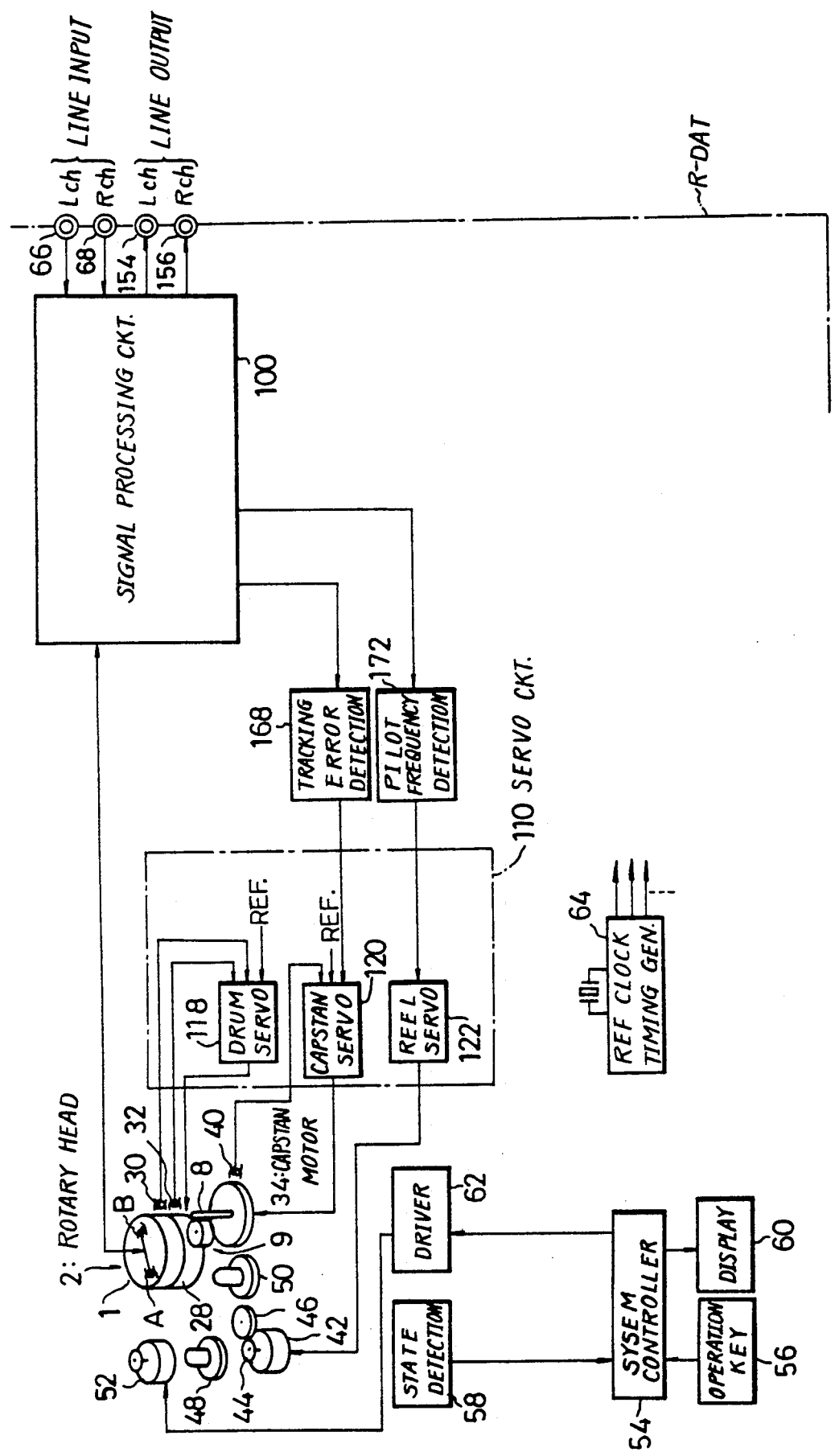
FIG. 4 is a block diagram showing a general construction of the R-DAT to which this invention is applied.

FIG. 4 shows a general construction of R-DAT to which this invention has been applied.

A system controller 54 comprises a microcomputer and controls operations at each section in accordance with contents of commands issued by a keyboard 56 or detection section 58 inside the system, displaying necessary items such as music number and time on a display 60.

A reference clock/timing generation circuit 64 generates various reference clocks and timing signals to be used in the signal processing system or servo processing system by quartz oscillation outputs.

A rotary head 2 has two magnetic heads A and B arranged on the circumferential surface of a drum 1 at an interval of 180 degrees. The head 2 is driven by a drum motor 28. The head 2 is further provided with an FG (frequency generator) 30 for outputting a signal at a period determined by equally dividing one rotation of the drum 1 and a PG (phase generator) 32 for detecting reference rotational position of the drum 1.

A capstan motor 34 comprises a motor shaft comprising a capstan 8, and a pinch roller 9 abuts on the capstan 8 to control and run the tape. An FG 40 is provided on the capstan motor 34 for speed detection.

A reel motor 42 drives reel tables 48 and 50 via pulleys 44 and 46 to wind the tape. Fast feeding and rewinding are effected by releasing engagement between the pinch roller 9 and the capstan 8 and driving the reel motor 42. During fast feeding, the pulley 46 is caused to abut against the reel table 50 and the reel table 50 is driven whereas during rewinding, the pulley 46 is caused to abut against the reel table 48 and the reel table 48 is driven. A loading motor 52 loads casettes and tapes, and is actuated by a driver 62 responsive to a command from the system controller 54.

In the recording mode, analog audio signals of left and right channels are applied from input terminals 66 and 68. These signals are A/D converted in a signal procesing circuit 100, added with control signals including an ATF signal and sub-code information and are supplied to the heads A and B for recording on the tape.

In a servo circuit 110, a drum servo circuit 118 compares signals produced by FG 30 with the reference clock produced by the reference clock/timing generation circuit 64 in frequency in the recording mode to control the rotation of the drum motor 28 normally to 2,000 rpm through PLL control. The drum servo circuit 118 controls the rotation phase of the rotary head 2 utilizing this invention for setting the supply timing of the data fed to the heads A and B and detection timing of the drum reference position detected by PG 32 at a predetermined timing and for causing the output of the FG 30 and its reference clock to be locked at a predetermined phase difference so that the recorded signal may be correctly recorded on the tape without a phase error. This control will be described more fully later.

The capstan servo circuit 120 controls the capstan motor 34 in PLL control to set the tape speed at a predetermined rate (8.15 mm/s) by comparing the output from FG 40 with the reference clock in frequency and phase.

In the recording mode, a reel servo 122 drives a reel motor 42 to optimally suspend the tape without sagging.

In the reproduction mode, the signals recorded on the tape are read by the heads A and B, demodulated by the signal processing circuit 100, D/A converted and supplied to left and right channel output terminals 154 and 156. A tracking error detection circuit 168 detects a tracking error based on an ATF signal in the reproduced signal. The tracking error signals are fed to the capstan servo circuit 120. The capstan servo circuit 120 controls the revolution rate of the capstan motor 34 so as to reduce the tracking errors to zero and thereby control the tape running speed.

The drum servo circuit 118 performs rotation at a predetermined speed in response to reference clock as in the recording mode. The reel servo circuit 122 drives the reel motor 42 so as to prevent sagging of the tape as in the recording mode.

The pilot frequency detection circuit 172 is a circuit for fast searching which detects a pilot signal f1 among the ATF signals. During fast searching, it is necessary to occasionally read data such as start ID, music number and time data out of the recorded content on the tape in order to "fast forward" or "rewind" the tape to a target position. For the purpose, the relative speed between the heads A and B and the tape should be restricted at a value substantially same as that of recording. The pilot signal f1 is used for controlling such rotation speed. In other words, as the pilot signal f1 is recorded in 130.67 kHz, the reel servo circuit 122 is controlled to set the pilot signal f1 detected in the search at the frequency of 130.67 KHz. This enables reading of data such as start ID, music number and time data in sub-codes and feeding of the tape to the target position correctly.

Figure 5:
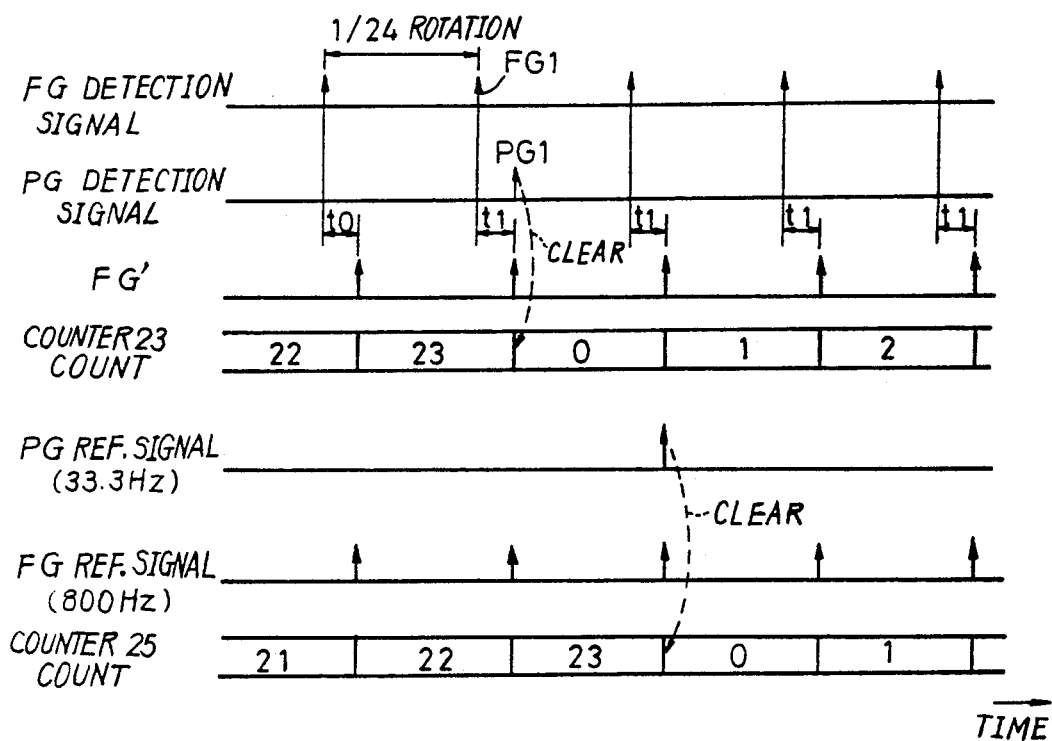
FIG. 5 is a waveform diagram showing the phase control operation by the circuit of FIG. 1.

A specific example of the rotation phase control in the drum servo circuit 118 according to the invention will be described with reference to FIG. 1, the operation thereof is illustrated in FIG. 5. In this example, for cancelling phase difference between detection signals of FG 30 and PG 32, the detection signal of the FG 30 is shifted by a time length corresponding to this phase difference.

Figure 3:
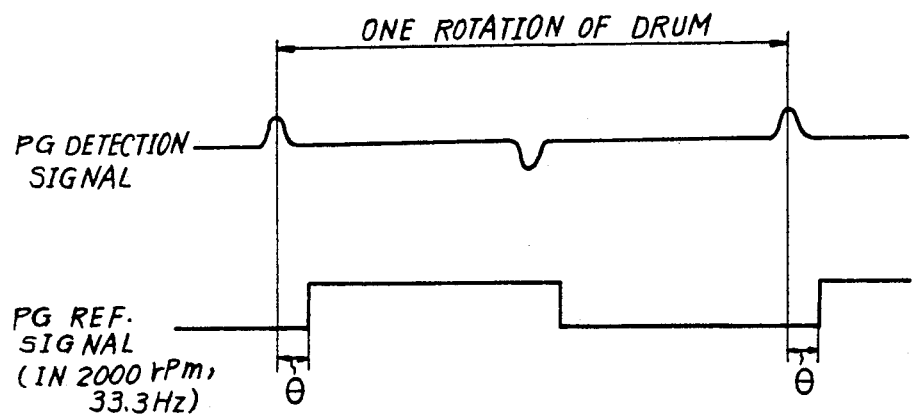
FIG. 3 is a waveform diagram showing the phase control operation by the device of FIG. 2.

The FG 30 produces, as the FG detection signal, a pulse signal at a period determined by equally dividing one rotation of the drum 1 (equally divided by 24 in this example), i.e., with frequency of 800 Hz in the case where the revolution number of the drum is 2000 rpm. The PG 32 produces, as the PG detection signal, a pulse signal as shown in FIG. 3 once for each polarity for one rotation of the drum 1 (33.3 Hz in the case where the revolution number of the drum 1 is 2000 rpm). The PG reference signal is a signal which has been conventionally used for controlling rotation phase by comparing phase with the PG detection signal. The PG reference signal is generated by a reference clock/timing generation circuit 64 in FIG. 4 at a frequency of 33.3 Hz (in the case of the mode 1) so as to synchronize with the signals to be recorded on the tape.

Figure 1:
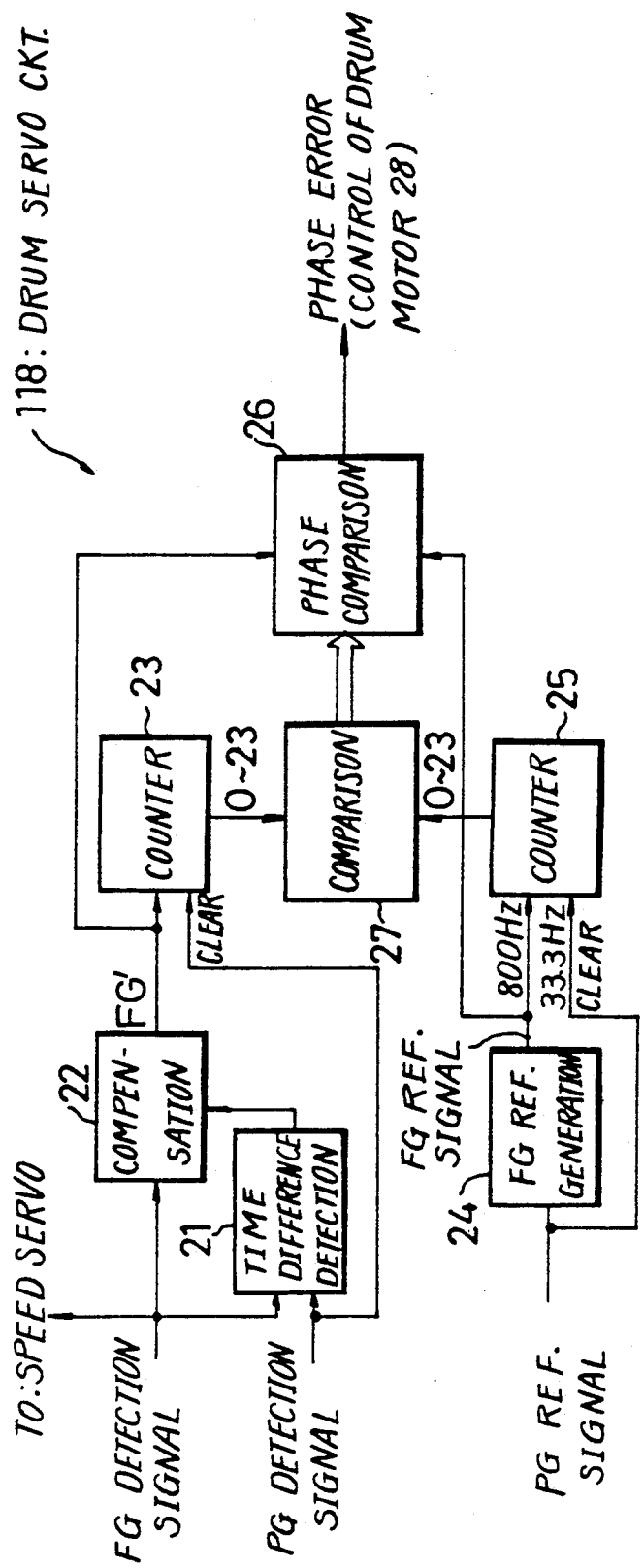
FIG. 1 is a block diagram showing an embodiment in which this invention is applied to an R-DAT.
Figure 2:
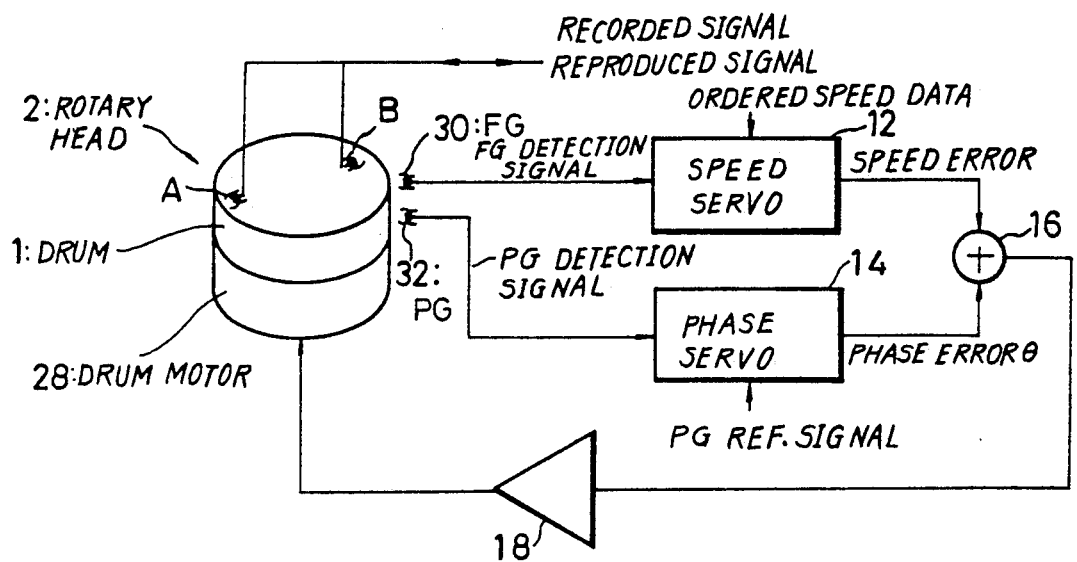
FIG. 2 is a block diagram showing the prior art rotation control device.

In FIG. 1, a time difference detection circuit 21 detects and stores time difference between the FG detection signal and the PG detection signal. The positional relationship between the FG 30 and the PG 32 is fixed but the time difference between these detection signals varies with the rotation speed of the drum 1. The time difference detection circuit 21 detects time difference and renews its storage each time the PG detection signal in the positive region is obtained.

A compensation circuit 22 provides the FG detection signal after delaying it by time difference stored in the time difference detection circuit 21. By this arrangement, the FG detection signal is obtained at a position determined by equally dividing one rotation of the drum 1 by 24 on the basis of the PG detection signal (hereinafter referred to as "FG' signal"). The FG' signal provided by the compensation circuit 22 is applied to a counter 23 to increase its count. The counter 23 is cleared each time the PG detection signal is obtained. Since the FG' signal has a frequency which is 24 times as high as the PG detection signal, the count of the counter 23 increases from 0 to 23.

An FG reference signal generation circuit 24 generates, as the FG reference signal, a signal having a frequency of 800 Hz which is 24 times as high as the PG reference signal (33.3 Hz) by, for example, a PLL circuit in accordance with the PG reference signal. A counter 25 is counted up by the FG reference signal and cleared each time the PG reference signal is obtained (i.e., its count increases from 0 to 23).

A phase comparator 26 compares, in phase, the FG' signal which is the FG detection signal corrected in time with the FG reference signal and phase locks the drum motor 28 by the PLL control in accordance with resulting phase error. Since the drum motor 28 is locked at any of the 24 equally divided rotational positions if the above control alone is carried out, a comparator 27 is provided for comparing count of the counter 23 with count of the counter 25 thereby to lock the drum motor 28 at a correct rotation phase. The count of the counter 23 represents a detected rotation position based on the PG 32 in the 24 equally divided rotation positions and the count of the counter 25 represents an ordered rotation position in the 24 equally divided rotation positions. These counts are compared with each other and the drum motor 28 is controlled so that the FG' signal and the FG reference signal are phase locked only when difference between these counts is a predetermined value. According to such control employing the phase error between the FG' signal and the FG reference signal, error information is sampled at 800 Hz with a result that speed of response increases as compared with the prior art device (the upper limit response frequency also is improved as compared with the prior art device).

The operation of the rotation control device of FIG. 1 will be described with reference to FIG. 5. Upon generation of a PG detection signal PG1, the time difference detection circuit 21 detects time difference t1 between the PG detection sigal PG1 and its immediately preceding FG detection signal FG1 and stores this value t1 until next PG detection signal (on the positive polarity side) is derived. The compensation circuit 22 delays all FG detection signals derived during this time by t1 and provides delayed outputs. The counter 23 is cleared by the PG detection signal and counted up by the FG' signal. The counter 25 is cleared by the PG reference signal and counted up by the FG reference signal prepared on the basis of this PG reference signal.

The comparator 26 outputs phase difference between the FG' signal and the FG reference signal as a phase error when the difference [count of the counter 25]−[count of the counter 23] is −1, 23 and 0 and thereby controls the drum motor 28 in phase. When the difference in count is 1 to 11 or −23 to −13, it is judged that the rotation phase is delayed from the reference position. In this case, the drum motor 28 is accelerated until the difference in count becomes either −1, 23 or 0. When the difference in count is 12 to 22 or −12 to −2, it is judged that the rotation phase leads the reference position. In this case, the drum motor 28 is decelerated until the difference in count becomes either −1, 23 or 0. Upon reaching this count difference, the phase difference between the FG' signal and the FG reference signal is provided to control the drum motor 28 in phase.

As a result of this control, the state shown in FIG. 5 is stabilized. The state of FIG. 5 is stabilized with the PG detection signal differing by 1/24 rotation (15 degrees) from the PG reference signal. This is because the PG 32 is disposed in such a position that the drum 1 reaches the rotation reference position at a position rotated by 15 degrees from a position at which the PG detection signal is derived so that this difference should be cancelled. If the position at which the PG 32 is disposed is changed, the amount of difference when the PG detection signal and the PG reference signal are locked also is changed according to the change in the position of the PG 32.

In the above described embodiment, time difference between the FG detection signal and the PG detection signal is detected and the FG detection signal is shifted by the time difference. Alternatively, the FG reference signal may be shifted in the reverse direction.

The same result will be obtained by shifting the recorded signal itself by the time difference and supplying this shifted signal to the head instead of shifting the FG detection signal or the FG reference signal.

In the above described embodiment, the locking of the drum motor 28 at a position other than a correct position is prevented by detecting the rotation position by affixing the position numbers 0 through 23 to the respective rotation positions with the counters. It is however possible to cause the drum motor 28 to be phase locked at a correct position without affixing such position numbers. For example, the prior art phase control relying upon the PG may be utilized so that the phase control by the PG is carried out until detection of the fact that the phase error has entered a certain narrow range (i.e., a range in which a correct rotation phase can be brought about by the phase control by the FG). By such arrangement, the drum motor 28 can be phase locked at a correct position without using the counters.

What is claimed is:

1. A rotation control device for a rotary head in a magnetic recording and reproducing device comprising:

a rotary head including frequency generating means for producing a frequency detection signal at a period determined by equally dividing one rotation of the drum and phase generating means for detecting a rotation reference position of the drum and providing a phase detection signal independent of the frequency detection signal;

means for generating a phase reference signal as a reference signal for the phase detection signal;

means for generating a frequency reference signal as a reference signal for the frequency detection signal; and control means for controlling said rotary head by adjusting rotation phase of the drum to a predetermined state by the controlling rotation of the drum in accordance with a phase error between the phase detection signal and the phase reference signal and a phase error between the frequency detection signal and the frequency reference signal in such a manner that the phase detection signal is locked with the phase reference signal at a predetermined phase difference and the frequency detection signal is locked with the frequency reference signal at a predetermined phase difference.

2. A rotation control device as defined in claim 1 wherein said frequency reference signal generating means generates, on the basis of said phase reference signal, the frequency reference to signal so that it is synchronized with the phase reference signal.

3. A rotation control device as defined in claim 2 wherein said control means comprises:

memory means for detecting and storing, each time the phase detection signal is derived, time difference between the phase detection signal and the frequency detection signal;

compensation means for imparting time compensation by the time difference stored in said memory means to all of the frequency detection signal or the frequency reference signals occurring during period of time until next phase detection signal is provided; and said control means compares the frequency detection signal with either the frequency reference signal or the frequency detection signal in phase so that the frequency detection signal is locked with the frequency reference signal at the predetermined phase difference.

4. A rotation control device as defined in claim 3 wherein said control means further comprises first counter means for counting the frequency detection signal, second counter means for counting the frequency reference signal and a comparator for comparing counts of said first and second counter means, the drum being controlled in such a manner that the frequency detection signal is locked with the frequency reference signal only when difference between the counts is a predetermined value.

5. A rotation control device as defined in claim 4 wherein said magnetic recording and reproducing device is a rotary head digital audio tape device.

* * * * *